United States Patent [19]

Sacchi

[11] Patent Number: 5,564,483
[45] Date of Patent: Oct. 15, 1996

[54] UNIT FOR MACHINING WORKPIECES, IN PARTICULAR WOOD

[75] Inventor: Paride Sacchi, Rimini, Italy

[73] Assignee: SCM Group S.p.A., Rimini, Italy

[21] Appl. No.: 325,887

[22] Filed: Oct. 19, 1994

[30] Foreign Application Priority Data

Oct. 22, 1993 [IT] Italy .................... BO93A0422

[51] Int. Cl.$^6$ .................... B27C 9/00; B25H 1/00
[52] U.S. Cl. .................... 144/139; 144/2.1; 144/134.1; 144/251.1; 144/252.2; 144/144.1; 144/286.5; 144/356; 144/421; 144/424; 29/33 P; 408/71; 409/173
[58] Field of Search .................... 29/33 P; 144/1 R, 144/2 R, 134 R, 134 A, 251 R, 252 R, 252 A, 144 R, 356, 139, 2.1, 134.1, 135.2, 135.3, 139, 144.1; 409/161, 173, 900.2, 903; 269/56, 57, 58, 74, 289; 408/70, 71

[56] References Cited

U.S. PATENT DOCUMENTS

| 1,422,140 | 7/1922 | Sears . | |
|---|---|---|---|
| 2,240,395 | 4/1941 | Evans | 144/286 R |
| 3,239,079 | 3/1966 | Leavesley, Jr. et al. . | |
| 4,292,006 | 9/1981 | Davies | 409/173 |
| 4,921,378 | 5/1990 | Kytola | 409/403 |
| 5,060,752 | 10/1991 | Heiberger . | |
| 5,125,141 | 6/1992 | Katoh et al. | 269/57 |

FOREIGN PATENT DOCUMENTS

| 2094268 | 2/1972 | France . |
|---|---|---|
| 3322013 | 8/1984 | Germany . |
| 3620247 | 12/1987 | Germany . |
| 4027895 | 3/1992 | Germany . |
| 1-306157 | 12/1989 | Japan . |
| 454649 | 12/1989 | Russian Federation . |
| 998471 | 7/1965 | United Kingdom . |

*Primary Examiner*—W. Donald Bray
*Attorney, Agent, or Firm*—Darby & Darby, P.C.

[57] ABSTRACT

A machining unit, typically for wood panels, features a work table afforded by a body of prismatic geometry having at least two faces and rotatable about an axis which is also its instantaneous center, in such a way as to establish at least two movable and tiltable work surfaces; the prismatic body is carried within a frame encompassing the tool and combining with the two faces to create respective independent work areas, one in which panels are fed to and from the unit, the other coinciding with a station at which machining takes place, and where the waste and chips generated by machining are cleared from the table and the work. The prismatic body also functions as the main barrier separating two work environments, the one an open external space occupied by the operator, the other an enclosure disallowing access to the operator while machining is in progress.

11 Claims, 7 Drawing Sheets

UNIT FOR MACHINING WORKPIECES, IN PARTICULAR WOOD

BACKGROUND OF THE INVENTION

The present invention relates to a machining unit, in particular a machine for routing and/or boring wood preferably (though not exclusively) in the form of predominantly flat panels.

It is widely appreciated in the art field of woodworking machines (the field to which the invention specifically relates, though without excluding the possibility of its application in similar fields concerned generally with the processing of parts, whether machining by the cutting of a chip, or the fitment of fasteners, accessories, etc.) that one of the factors most liable to influence the output capacity of a work station, i.e. a unit composed of a work table, infeed and outfeed sections and at least one tool, is down time, or in the parlance of some authors, time that cannot be "hidden".

The significance of this expression derives from the fact that time not strictly of an operational nature (i.e. time needed to change the workpiece, or to effect a change of tool, or a set-up, etc.) tends in reality almost never to be "covered" by a parallel active step in which the tool engages the work; this is even more of a drawback in machines of the latest generation, using numerical control, in which the typical operating times for tools are far less than the times taken to change or position the work: accordingly, one must conclude that such machines do not effectively operate in a situation where down time can be hidden, and consequently that their technological sophistication is not in proportion to their output potential.

The main operations typically occasioning down time are: the infeed/outfeed of work from/to a conveying surface onto and from the table (almost invariably horizontal) on which the work can be clamped and positioned in relation to the tool; clearing the work table of chips or dust generated by machining; tipping solid scrap from the table; changing tools at the end of the machining run and setting up for a new size of piece, and so forth.

Working to a general model of construction for a machining unit composed, as already intimated, of a horizontal table on which to secure the work and a tool assembly mounted over or alongside the table, it has been sought hitherto by means of particular expedients to minimize the down time in question: by way of example, such expedients have centered on the adoption of palletization equipment designed to operate in conjunction with special feed systems (some employing robotics) by which the workpieces are supplied to the machining unit, as well as on ways of speeding up the tool change (using special revolver systems), etc.

Notwithstanding the undoubted reductions in down time that have been achieved through the adoption of improvements as outlined above, these have not been accompanied by a proportionate increase in output to levels commensurate with the essential operating capabilities of machines now available for purchase, whereas in the meantime, the overall cost of such machines have risen (and in no small measure). Thus it happens, in practice, that there are CNC units of ultrahigh manufacturing potential, currently in circulation, which are able to perform notably complex machining operations on a workpiece in just a few seconds but which also require an inordinately long time (almost triple the machining time) for completion of the auxiliary operations mentioned previously, albeit these are a mandatory part of the machining cycle.

This disparity between active and passive times is accentuated further in the field of machines with medium-high output capabilities, and in particular where the work being machined exhibits the maximum dimensions accommodated by the unit (such as large desks or tabletops): in this instance, down times are prolonged precisely by reason of the machine architecture, which restricts the possibility of effecting intermediate operations between one item and the next as the line is completely occupied by the item currently being machined.

An additional drawback encountered in conventional machines, likewise by reason of their architecture, is the practical problem of confining and removing the waste generated by machining, which stems from the difficulty in achieving a separation between the machining area and the infeed-outfeed station occupied by the operator, and is accompanied by a series of negative consequences connected with the effects of pollution from dust, noise, etc.

Accordingly, the applicant discloses a machining unit for wood of which the design is based on the premiss of utilizing a plurality of work tables, not, however, fixed in a horizontal position, but rotatable about an axis (preferably horizontal) and incorporated into a single element, thus realizing a compact and safe structure such as will allow also of minimizing down times: the purpose of such a solution is therefore to optimize the machining operations by achieving a drastic reduction in the time taken to complete auxiliary tasks involving the workpiece, or rather to the extent that certain non machining operations (cleaning the work table, changing the work, removing waste) can be performed in what are effectively "hidden" times. A further advantage afforded by the unit disclosed is that it allows a complete isolation of the infeed-outfeed station from the machining enclosure inside which chips and dust are generated, thereby enhancing the activity of the operator.

SUMMARY OF THE INVENTION

The unit disclosed is of a basic type widely used for machining wood panels, that is to say, composed essentially of a work table, one more toolheads by which the workpiece is machined, and at least one infeed zone and one outfeed zone by way of which the workpiece enters and leaves the table.

To particular advantage, the work table of the unit disclosed is associated with at least one body of prismatic geometry exhibiting at least two faces and rotatable about an axis that coincides with the instantaneous center of the body itself, in such a way as to create at least two corresponding mobile and tiltable work surfaces. The prismatic body is supported by a frame encompassing the tools and combining with the two rotatable faces to establish corresponding independent work areas: one located externally of the frame, accommodating the infeed and outfeed of workpieces to and from the unit, and another within the frame, in which the workpiece is machined and scrap/chips generated by machining are cleared from the table.

The selfsame prismatic body also functions as the principal barrier element separating the two work areas, the external area being open and occupied by the operator, the internal machining area enclosed and shielded from the operator.

BRIEF DESCRIPTION OF THE DRAWINGS

The invention will now be described in detail, by way of example, with the aid of the accompanying drawings, in which.

DESCRIPTION OF THE PREFERRED EMBODIMENTS

As illustrated in the accompanying drawings, and with reference particularly to FIGS. 1–4 and 8, the unit disclosed is designed to machine workpieces 1 in wood and comprises a universally recognizable work station such as can be incorporated typically into complete production lines for the realization of wood panels as used in the assembly of fixtures, modular furniture and the like.

The fundamental elements of such a unit or station include a work table 2 on which the workpiece 1 is supported and disposed facing one or more cutting or boring tools 3 (routers, hoggers, bits, etc.); the work table 2 also affords an infeed zone Ze and an outfeed zone Zu by way of which the workpiece 1 enters and leaves the station, and which in effect will coincide with the infeed and outfeed conveyor lines in any conventional system, for example using robotics, with belt feeders or similar media.

The work table 2 of the machining unit according to the present invention is not fixed, as in familiar design solutions adopted hitherto, but embodied (in the examples illustrated) as a body 4 of prismatic geometry exhibiting a plurality of faces.

Figure 8:
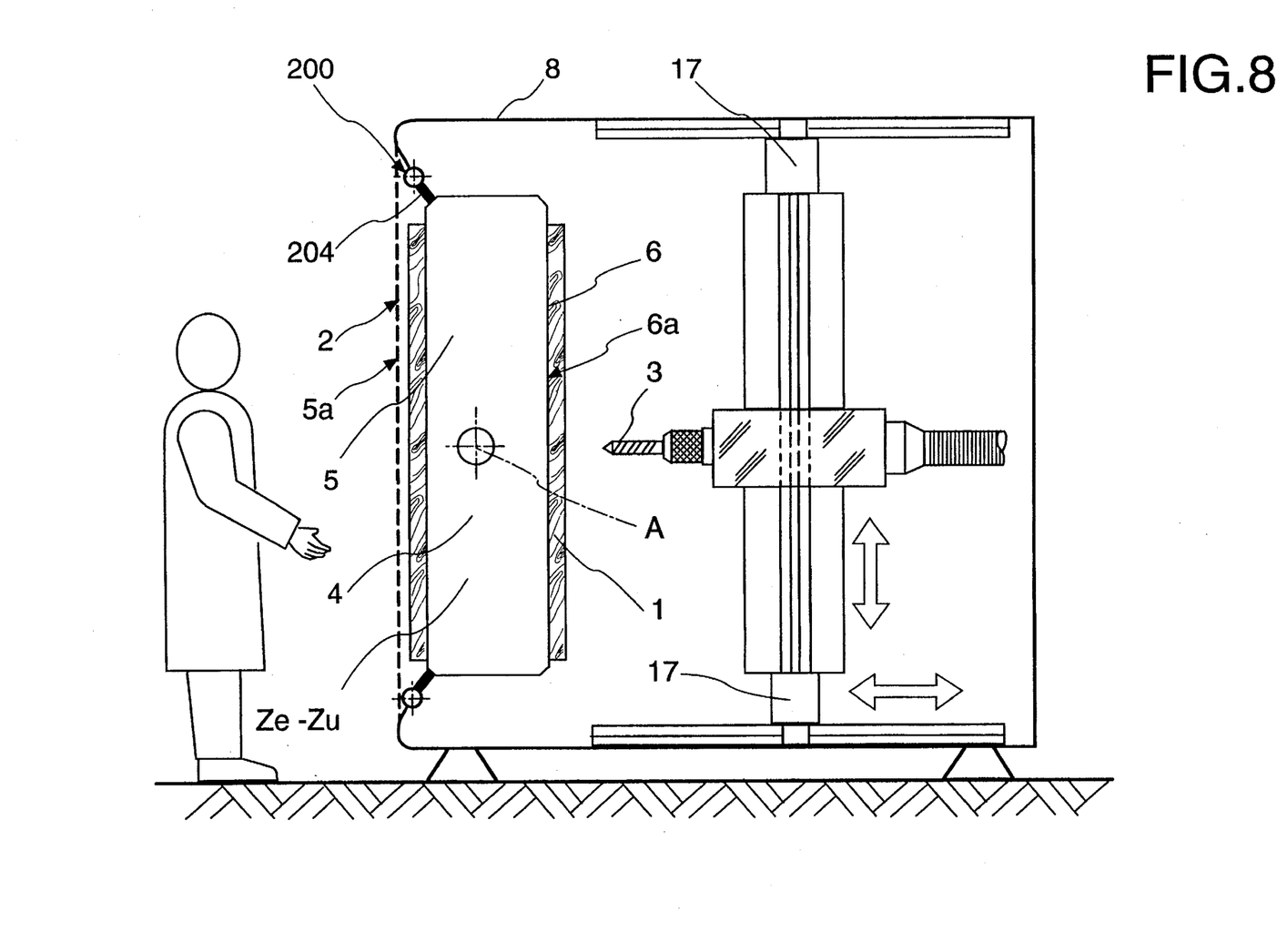
FIG. 8 affords a particularly simplified schematic representation of the wood machining unit according to the invention, viewed in a side elevation with certain parts omitted better to reveal others.

Firstly, the indicative and schematic illustration of FIG. 8 represents a simplified embodiment of the machining unit disclosed, and is included in order to highlight the intrinsic validity of the solution adopted before proceeding to a fuller description in due course. The drawing shows a machine equipped with a prismatic body 4 having just two principal faces 5 and 6, the one affording an infeed-outfeed surface by way of which to direct the succession of workpieces 1, the other a work surface and a screen from which the chips/scrap generated by machining are caused to drop. At all events, the design has certain key features: the work table 2 afforded by the prismatic body 4 is divided into a plurality of single tables, creating tiltable surfaces that can be utilized simultaneously, respectively to infeed or outfeed one workpiece 1 and to machine another; also, the unit exhibits a single frame 8 supporting the prismatic body 4 and containing the machining tool or tools 3. This facility is created by virtue of the fact that the prismatic body 4 is rotatable about an axis A coinciding with the instantaneous center of the body itself. As well as affording the work surfaces, the prismatic body also functions as a separating element located between two areas of the space occupied by the unit (the one external, in which infeed-outfeed of the workpiece 1 occurs, the other internal, where machining takes place); the separation is achieved, for example, with the aid of sealing means 200 which might consist in peripheral seals anchored to and supported by the frame 8 and surrounding the prismatic body 4. With this type of structure, therefore, the prismatic body itself becomes the principal barrier element between the external and internal environments of the machine.

Clearly, the solution described in the foregoing paragraph reflects a notably simplified version of the unit disclosed, whereas an optimization of this same arrangement can be seen in the adoption of a prismatic body 4 embodied with three faces 5, 6 and 7, and rotatable about its own horizontal axis A (disposed perpendicular to the bases of the prism), in such a way as to create three distinct tables each equipped with relative means (of conventional type and therefore not illustrated, but preferably utilizing suction or grippers, etc.) by which to clamp a workpiece 1 positioned on the corresponding surface. Whilst the prismatic body 4 proposed in this instance has three sides, there is nothing to prevent the adoption of some other configuration to accommodate particular operating requirements, for example a quadrangular or other polygonal base, as will be made clear in due course.

Figure 2:
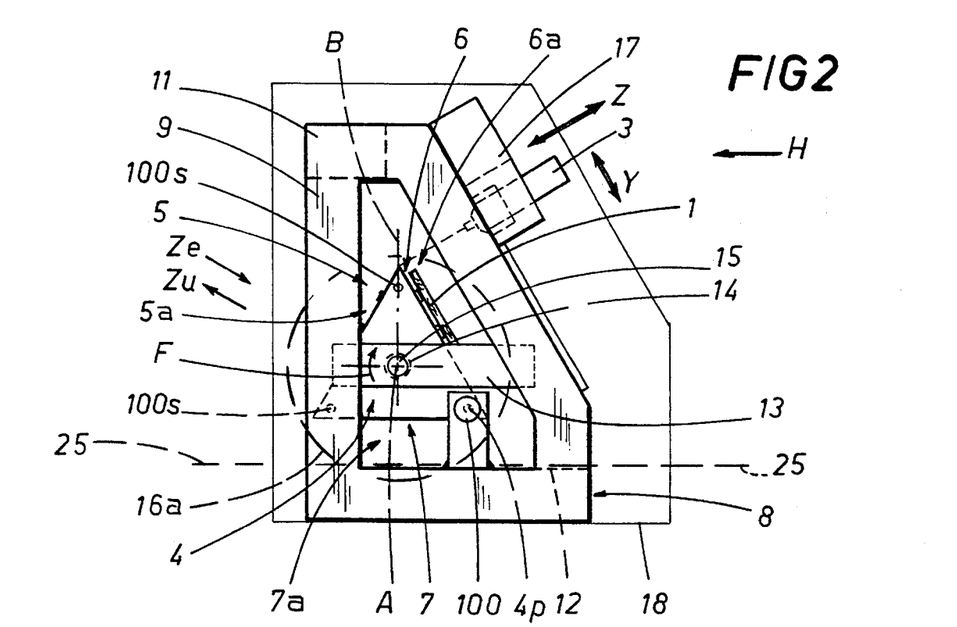
FIG. 2 illustrates the machining unit of FIG. 1 in a schematic side elevation.
Figure 3:
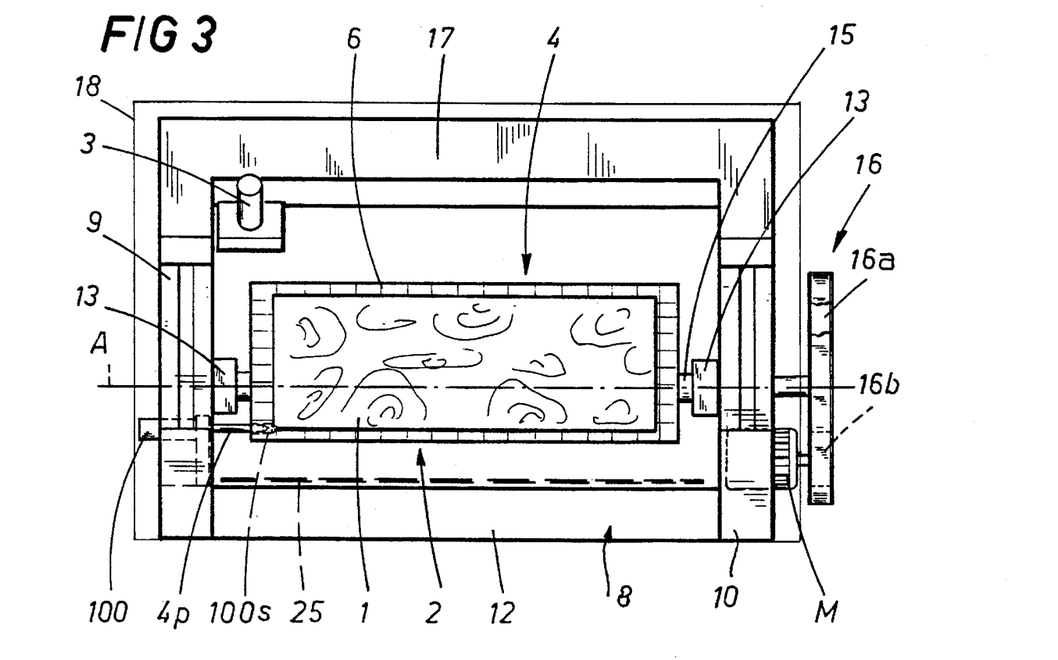
FIG. 3 is the view from H in FIG. 2, illustrating a prismatic body forming part of the unit disclosed.

As discernible also in FIGS. 2 and 3, the prismatic body 4 is supported by means coinciding with the aforementioned frame 8 and combining with the body to establish a plurality of distinct work areas 5a, 6a and 7a, each relative to a corresponding face 5, 6 and 7, which are independent one of another and mutually non-interfering.

More exactly (still referring to FIGS. 1, 2 and 3), the support frame 8 comprises a pair of uprights 9 and 10, located at opposite ends of the prismatic body 4, each exhibiting a closed loop profile of polygonal and preferably trapezoidal geometry. The uprights 9 and 10 are joined one to another by a pair of rails 11 and 12, the former interconnecting the shorter sides (positioned uppermost in FIGS. 1 and 2), and the latter the longer sides (positioned at the bottom in FIGS. 1 and 2), in such a way as to create a cage structure for the tool 3.

Each upright 9 and 10 presents a respective cross member 13 occupying an essentially central position and affording a relative cylindrical seat 14 in which one end of a horizontal shaft or pivot 15 is rotatably supported. The shaft 15 will coincide in practice with the aforementioned axis of rotation A of the prismatic body 4 and is connected to a drive system 16 serving to invest the body with angular motion; the drive system 16 is shown schematically in FIG. 3 (a flexible element such as a chain, for instance, looped around a driven member 16a keyed to the prismatic body 4 and a driving member 16b keyed to a motor M) and indicated strictly by way of example, being conventional in embodiment and not effectively a part of the present invention. In a preferred embodiment, the prismatic body 4 will be locked in position during machining operations by means of a taper pin 4p associated with one of the uprights 9 and 10, which is capable of movement in a direction parallel to the axis A, generated preferably by a reciprocating component 100, and positioned to locate in corresponding equispaced sockets 100s afforded by at least one base of the prismatic body (see FIGS. 2 and 3).

Turning now to the aforementioned independent work areas, it will be seen that with a prismatic body 4 of triangular geometry, these are three in number: the first such area 5a is angled in relation to a reference axis B disposed vertically and normal to the axis of rotation A of the body 4, and coincides with the infeed and outfeed zone Ze-Zu by way of which workpieces 1 are directed into and away from the unit; the second area 6a likewise is angled in relation to the reference axis B and accommodates the actual machining operations (boring or routing, for example) effected on the workpiece 1. In the third area, denoted 7a and disposed transversely to the reference axis B, the workpiece 1 is liberated of chips or dust, which will fall freely and/or with the assistance of an extraction and/or blower system, and heavier scrap generated by machining is also removed, in this instance being allowed simply to drop from the relative face 7, for example onto a conveyor belt 25 beneath, and distanced from the structure of the unit in a direction normal to the viewing plane of FIG. 2.

Returning to the second work area 6a, it will be observed (FIG. 1) that the unit comprises a carriage or slide 17 of upturned-U shape associated with the corresponding part of the two uprights 9 and 10, which serves to support the tool 3 and is able to traverse back and forth along an axis denoted Y, guided by the selfsame uprights; the tool 3 is also able to traverse along the slide 17 in a direction parallel to an axis denoted X, and adjustable for depth along an axis Z perpendicular to the plane occupied by the relative face 6 of the prismatic body 4: accordingly, one has a tool 3 that can be controlled on the classic three axes and positioned at any point on the face 6 offered by the prismatic body 4, and of which the movement, combined with those of the slide 17 and of the body 4, might also be governed and synchronized by an external control unit (not illustrated).

Figures 1, 4:
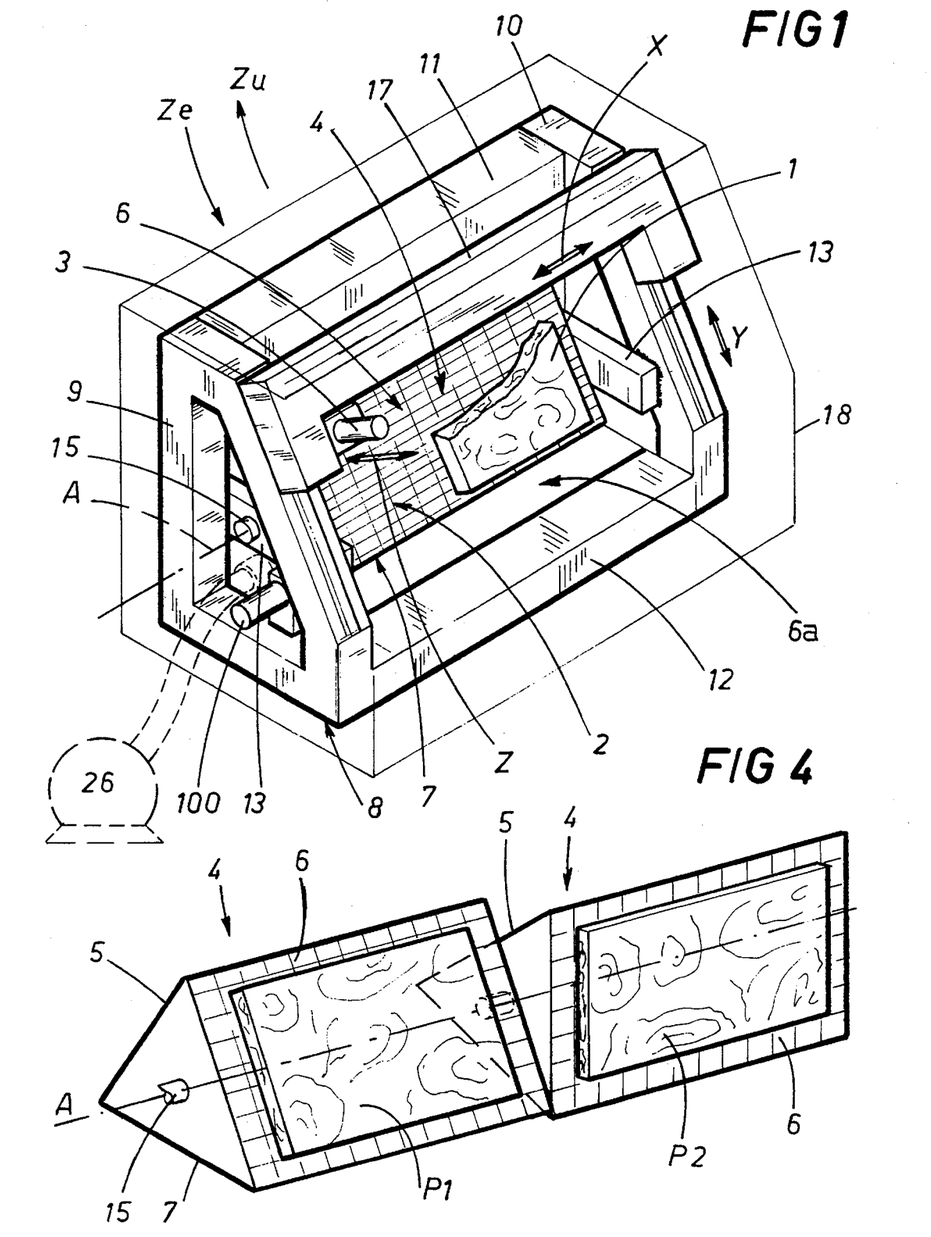
FIG. 1 illustrates a first simplified embodiment of the machining unit for wood to which the present invention relates, shown schematically in isometric projection and with certain parts omitted better to reveal others.
FIG. 4 illustrates an alternative embodiment of the prismatic body discernible in FIGS. 1 to 3.

Given the compact dimensions of the structure thus far described, which in effect is fashioned around the prismatic body 4 with the body itself as the "barycentric" element (in geometrical terms), the uprights 9 and 10 and rails 11 and 12 can be clad in a protective and soundproof casing 18 of profile matched to the peripheral outline of the uprights. The operation of the unit will now be described, commencing from a start-of-cycle configuration in which the faces of the prismatic body 4 functioning as work tables are all unoccupied by workpieces 1. A first workpiece 1 is introduced frontally via the infeed zone Ze into the first area 5a and clamped to the respective face 5 of the prismatic body 4, which then rotates in the clockwise direction, as viewed in FIGS. 1 and 2 (see also arrow F), through an angle (120° in the case of a triangular prism) such as will bring the workpiece 1 into the second area 6a, i.e. facing the tool 3, as illustrated in FIG. 1.

With the prismatic body 4 locked in this position, machining operations are carried out on the first workpiece 1 while a second workpiece 1 is conveyed through the infeed zone Ze and positioned on the vacant face (still denoted 5), which will have been brought into the first area 5a as a result of the aforementioned rotation.

Machining being completed on the first workpiece 1 occupying the second face 6, the prismatic body 4 rotates further in the clockwise direction to take the first workpiece 1 into the third area 7a where the waste matter generated by machining is cleared away, either by falling freely as the result of the prismatic body 4 simply rotating and overturning, or removed forcibly by an extractor system; at the same time, the unit will be machining the second workpiece 1 secured previously to the second face 6 and rotated into the second area 6a, while a third workpiece 1 is introduced and secured to the free face 5 brought into the first area 5a by the second rotation. At this point, the unit is operating at full capacity.

With the next rotation of the prismatic body 4, the first workpiece 1 is returned to the first area 5a (which is now an outfeed zone Zu) and removed so as to make room for a further workpiece 1, whilst the second workpiece 1 occupies the face 7 associated with the third or cleaning area 7a and the third workpiece 1, now on the second face 6, is machined in the second area 6a. The cycle continues to be repeated in this same fashion.

Referring to the earlier mention that use might be made of extraction to remove chips (or dust, where machining consists simply in the sinking of holes), such an arrangement is easily and simply realized, thanks to the geometry of the unit disclosed, by establishing a marginally negative pressure in the entire environment around the prismatic body: this in particular is an advantage afforded by the ease of control over the casings and seals of the unit disclosed. A practical example is illustrated in FIG. 3, where 26 schematically denotes the source of negative pressure.

The solution described thus far is that exhibiting the simplest geometrical configuration envisaged. Naturally, as a consequence of having replaced the conventional single fixed work table with a movable and multiple type, the further possibility exists of utilizing two or even more geometrically similar prismatic bodies arranged one beside the next along the length of the axis of rotation A (see FIG. 4), such as would allow operations to be executed in sequence while remaining independently controlled: in short, a battery of modularized units. In this instance, two distinct workpieces P1 and P2 could be machined at once in similar or different fashion with separate tools, thereby enhancing productivity of the unit as a whole, particularly when turning out batches of smaller items.

Figure 9:
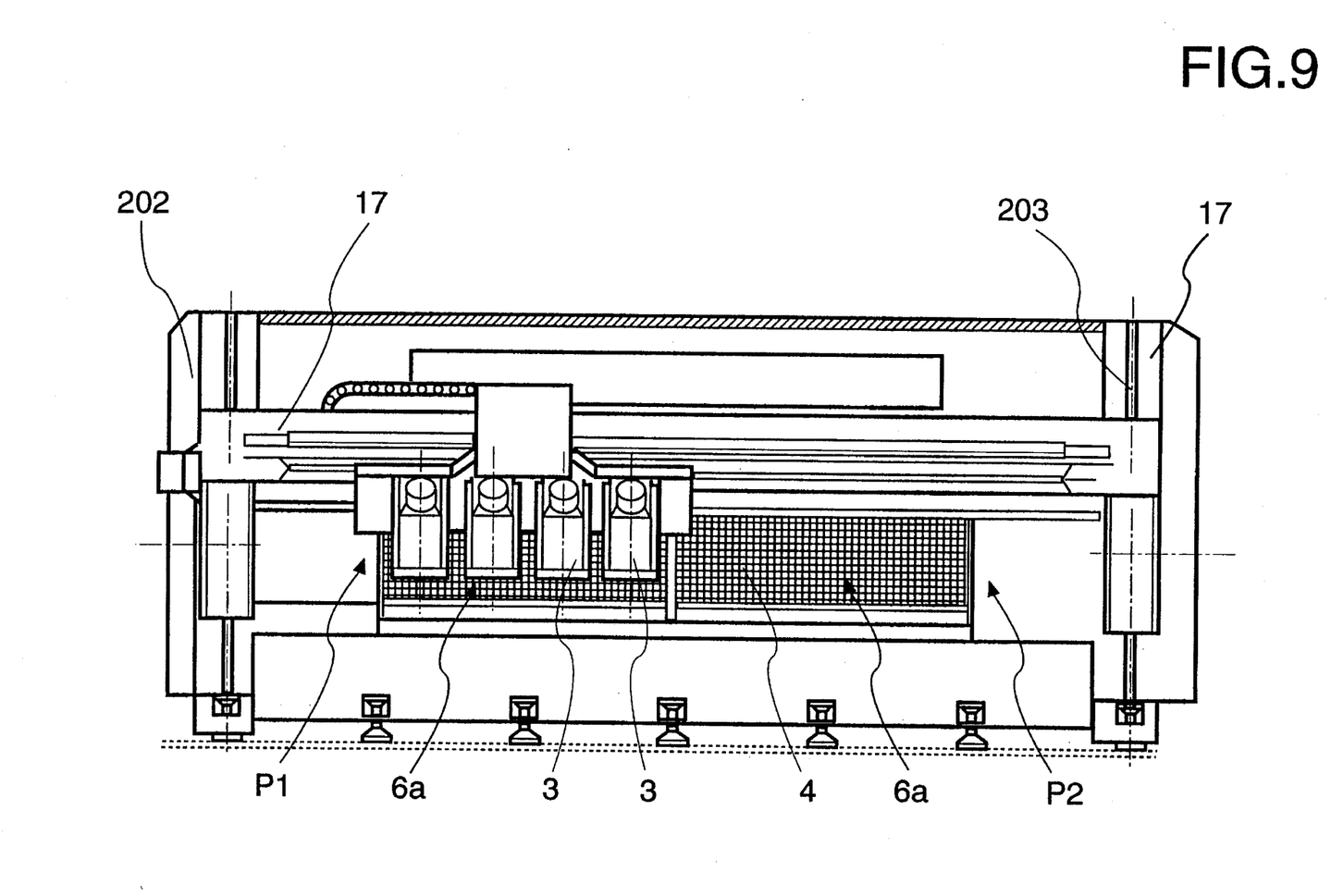
FIGS. 9 and 10 illustrate a practical embodiment of the unit shown in FIGS. 1 to 4, viewed respectively in a frontal elevation, from the rear, and in a side elevation with certain parts omitted relative to FIG. 9.
Figure 10:
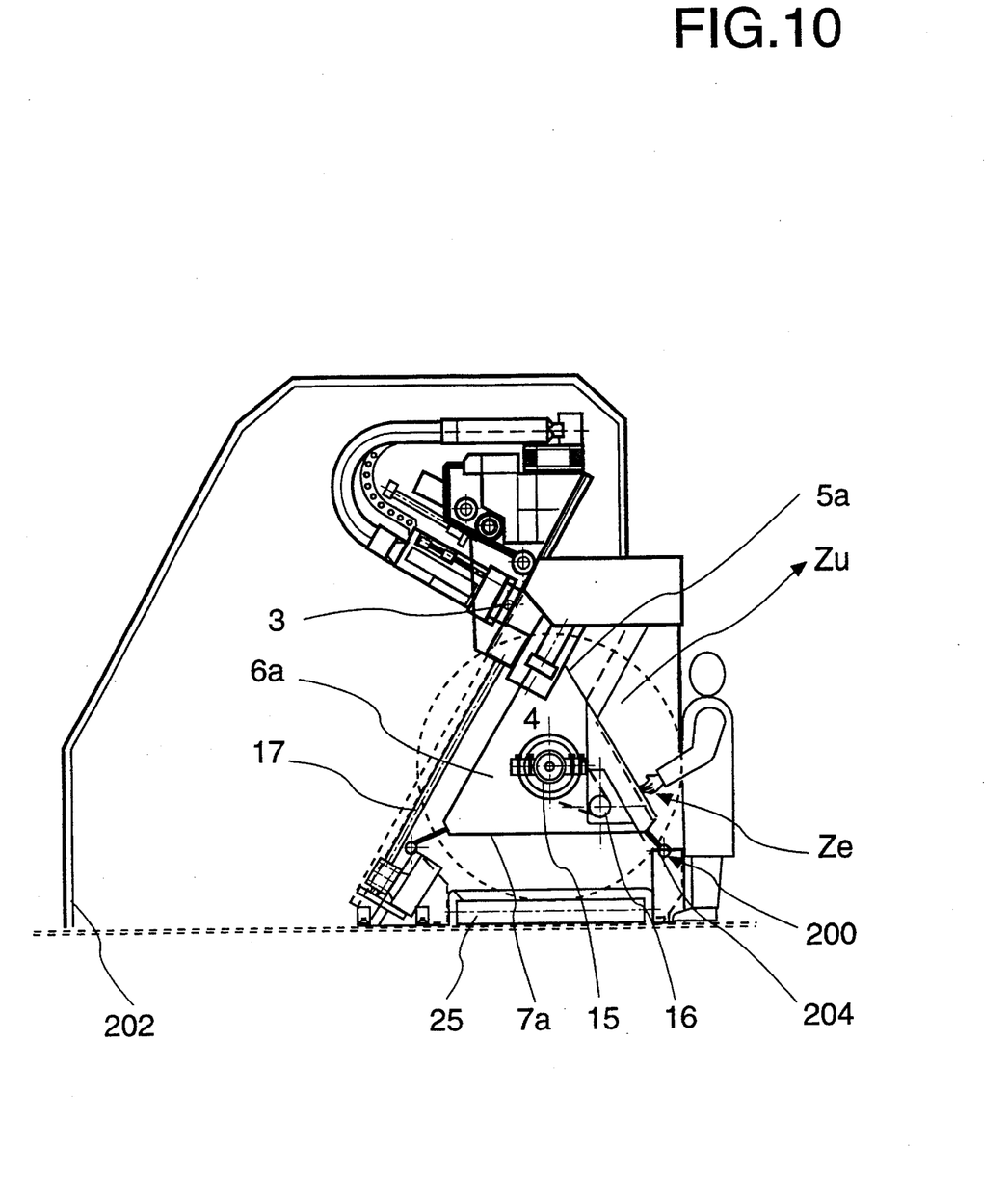

FIGS. 9 and 10 illustrate a fully realized solution of the machining unit thus far described. FIG. 10 in particular shows a booth 202 serving to enclose the entire assemblage of equipment making up the unit and to soundproof the work area, which accommodates two prismatic bodies 4 disposed mutually adjacent as intimated in the foregoing paragraph. Also shown in FIG. 10, and in greater detail, is a more complex system of manoeuvring the tool 3, with U-profiled ways 203 guiding the movement of a slide 17 which supports a plurality of tools 3. In this particular embodiment, each of the work areas 5a, 6a and 7a around the prismatic body 4 is isolated from the next by sealing means 200 that consist effectively in movable barriers 204 anchored pivotably to the frame 8 at points coinciding with the vertices of the triangular profile presented by the prismatic body 4.

As already mentioned, the possibility exists of a solution in which the prismatic body exhibits a configuration with four or more work faces, for example where distinct machining operations need to be executed in sequence.

A unit embodied in accordance with the principles of construction described and illustrated affords many advantages:

the movement of workpieces from one station to another by rotation of a table or tables, rather than by a linear transfer as in previous solutions, allows a reduction in the overall dimensions of the machine;

the geometry and rotation of the prismatic body allow several operations to be performed at once with no interference between the individual work tables;

concurrent infeed and outfeed points allow the use of swift and simple automatic feed systems;

independent work areas allow a better overlap and utilization of cycle times, even in the event that the dimensions of the workpiece may correspond to the maximum permissible specified for the machine;

adopting a prismatic configuration for the work table structure and the controlling the surrounding space, machining dust (or chips, shavings) can be removed entirely by free fall and extraction, thus dispensing with the need to airblast the work and avoiding the creation of a dust-laden environment;

the prismatic body functions as a barrier between the operator (who is stationed on the side of the infeed-outfeed zone Ze-Zu) and the machining area occupied by the tool, so that with the tool fully enclosed within the frame and booth, any breakage that might occur will not result in fragments or debris reaching the operator, who is shielded by the selfsame prismatic body; accordingly, greater passive safety is afforded by the unit, over and above the benefit to the operator of occupying an area free of machining dust and chips;

ease of control in and around the machining area allows the adoption of a totally enclosed design, and a reduction in environmental noise levels;

the possibility of utilizing two or more areas of polygonal section rotating about the same axis, as aforementioned, proportionately increases the work areas and the number of steps that can be performed simultaneously; in addition, there is the facility of staggering the sections in the angular direction so that the end faces of the work can be machined;

toolage can be changed on one section of table without the need to interrupt machining operations on the other available sections and without either reducing the efficiency of the unit or affecting the machine logic;

the axis of rotation A can be used as a control axis, hence an axis interpolating with the other controlled axes of the machine;

at all events, the solution proposed does not prevent the operator from gaining access to the work area, typically for the purpose of servicing or changing tools, or in order to check the steps or the quality of the machining process, or even to change single workpieces in the context of sample jobbing or for whatever other reason such a change might be required: in short, an industrial class machining setup equally suitable for one-off items or small batch production.

Figure 5:
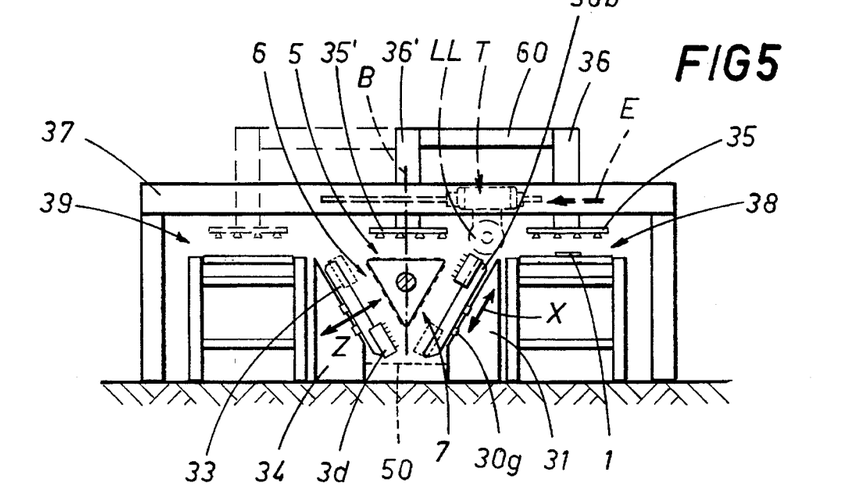
FIG. 5 illustrates a second possible embodiment of the machining unit disclosed, viewed schematically in a side elevation.
Figure 6:
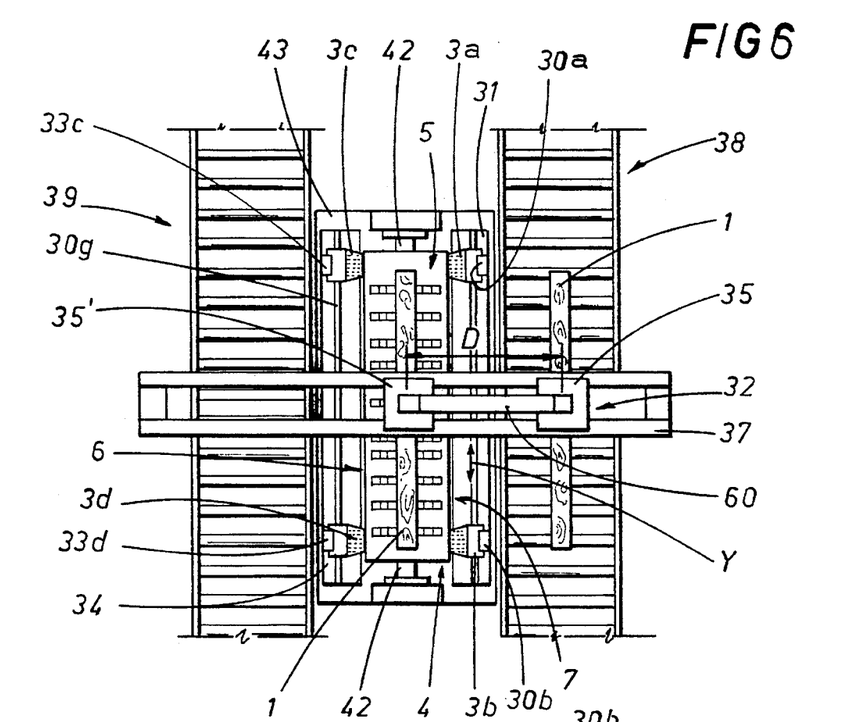
FIG. 6 illustrates the machine of FIG. 5 in plan from above.
Figure 7:
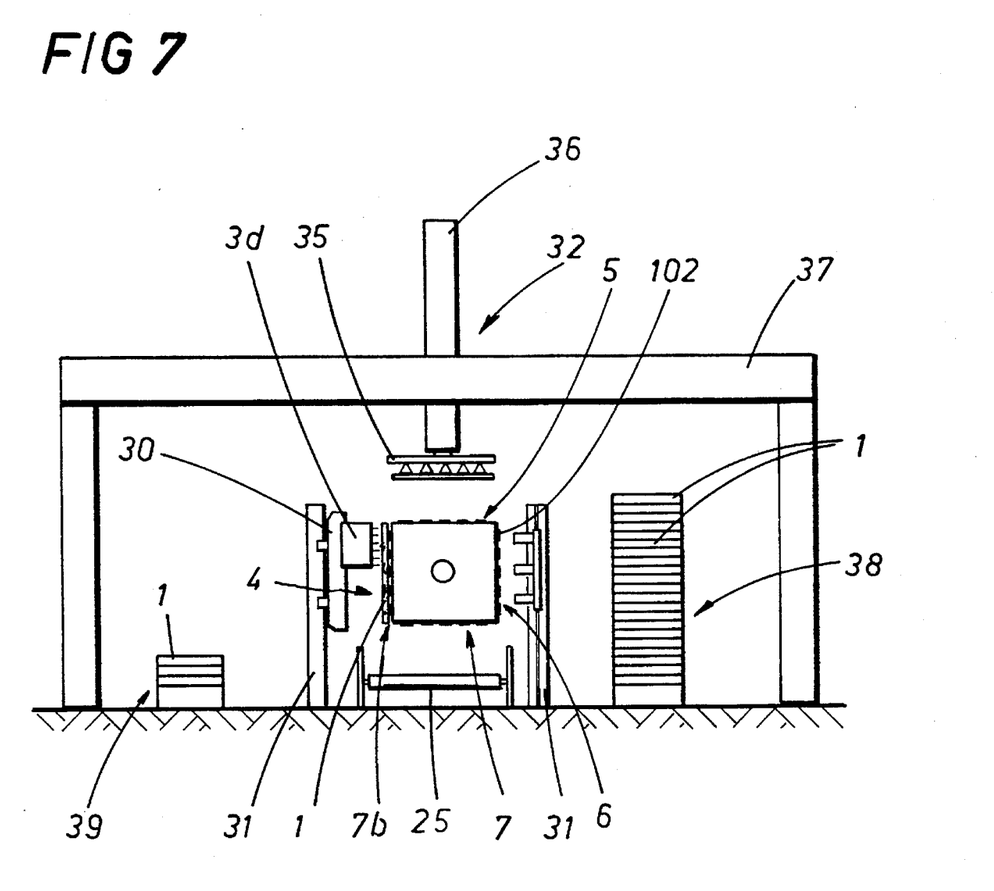
FIG. 7 illustrates a further possible embodiment of the machining unit disclosed, viewed schematically in a side elevation.

The advantages of the solution proposed are amply demonstrated in the example of FIGS. 5, 6 and 7, which shows a machine unit configured specifically to operate as a boring jig for drilling holes in panels. Problems presented by the removal of waste are eliminated in this instance, since unlike the examples illustrated thus far, i.e. referring to processes in which substantial portions of material may be machined away by routers or hoggers, the waste generated by boring will consist largely of dust and therefore is easily cleared by extraction within a physically and volumetrically controlled environment.

In this embodiment the prismatic body 4, still of triangular section, is positioned with one vertex at the bottom, or rather with the infeed-outfeed or first face 5 horizontally disposed, whilst the two remaining angled faces 6 and 7 are accessible from beneath.

The prismatic body 4 is supported at its two ends by a power driven shaft 42 anchored rotatably to a frame 43 and controlled in such a way as to produce a timed rotation of the body 4.

The tools 3 are arranged in groups according to the particular boring programs selected; in the example of FIGS. 5 and 6 these groups are arranged in pairs and denoted 3a, 3b, 3c and 3d.

Observing FIGS. 5 and 6, the single groups of tools, for example 3a and 3b, are carried by respective spindle heads 30a and 30b capable independently of movement along two mutually perpendicular axes X and Y, traversing on ways 30g afforded by a bed 31 which is angled in relation to the aforementioned vertical reference axis B in such a manner that the heads 30a and 30b can be positioned in a plane substantially parallel to at least one face 7 of the prismatic body 4. The heads 30a and 30b are also capable of controlled movement toward and away from the selfsame face 7 along a third axis Z, thereby allowing the tools 3a and 3b to engage a workpiece 1 currently secured to the face in question.

Exploiting the particular geometrical configuration of the prismatic body 4 still further, a second identical bed 34 with relative spindle heads 33 can be added (in the example illustrated, two spindle heads 33c and 33d carrying relative groups of tools 3c and 3d), symmetrically with the first bed 31 on the opposite side of the vertical reference axis B, and offered to the remaining angled face 6, thus creating two independent work tables and allowing a convenient division of the operations performed on the workpiece 1 into suboperations performed by each of the groups of tools 3a, 3b, 3c and 3d. In this particular case, an extraction system 50 could be located below the two beds 31 and 34 in such a way as to draw in the dust generated when drilling the workpieces 1.

As the tempo of the boring operations is markedly higher than that obtainable when utilizing the type of unit with one machining face only, as described previously, use could be made of an infeed-outfeed system capable of operating at much greater speed in order to maintain a high output.

In this instance, workpieces 1 are conveyed to and from the unit by infeed-outfeed means 32 positioned above the prismatic body 4 in opposition to one of the faces (the horizontally disposed free face 5) and designed respectively to set down or pick up one workpiece 1 on or from the face 5 in question at the same time as the unit machines one or more other workpieces 1 secured to the remaining faces 6 and 7.

It will be noted that the horizontal configuration of the face 5 uppermost affords the possibility (see in particular FIG. 5) of a further practical enhancement, namely, the addition of a pre-infeed line along which workpieces 1 approach the unit substantially in the plane occupied by the free top face 5, and, installed on this line, a pre-crosscut station T with a blade LL positioned to size the length of panel stock advancing in a direction E perpendicular to the viewing plane of FIG. 5.

Returning to the machine unit and the details of its construction, the infeed-outfeed means 32 might be composed, as in the example of FIGS. 5 and 6, of a pair of horizontal tables 35 and 35' united by a relative pair of vertical members 36 and 36' and an interconnecting cross member 60.

The two horizontal tables 35 and 35' are set apart at a distance D equal to the distance between the top face 5 of the prismatic body 4 and a relative magazine 38 or 39 in such a way as will allow the infeed-outfeed means 32, for example, to transfer a machined workpiece 1 to the second magazine 39 by means of one table 35' while transferring a further workpiece 1 to the vacated face 5, simultaneously, by means of the other table 35.

In addition to the advantages already mentioned in respect of the first example of the unit disclosed, the following may be highlighted for the second:

the conception of the unit and its limited air requirement combine to allow the construction of built-in ducts and therefore a total elimination of the noise and leaks typical of loose external hose lines, which are also cumbersome and unsightly;

lower energy consumption (a not inconsiderable advantage, given an increasing general awareness of the need to conserve resources) is gained by virtue both of the lower suction power required and of a diminished heat loss resulting from the reduced exchange of air with the surrounding ambient;

the bulk of the machine is decidedly reduced in the three dimensions (especially when compared with existing conventional solutions), both as regards the unit itself and as regards the infeed-outfeed systems, which can be positioned free of obstacles and made to operate from directly over the machine. Not least among the advantages of such a solution is the elimination of a problem often betrayed by flexible borers, namely, that as a result of using compact multiple spindle heads and of the fact that these are required to perform a plurality of tasks, optimization of the single tasks is disallowed by reason of the numerous types of bore that have to be executed per minimal unit of time.

With the solution disclosed, by contrast, the tasks are divided up, thereby allowing one spindle head to be dedicated to a single task and increasing the flexibility of the heads and of the cycle without affecting production tempo.

A further and no less advantageous feature of the present invention, in the case of a unit set up to operate as a borer, is that the prismatic body 4 might be embodied with a quadrangular section as indicated schematically in FIG. 7; in this instance, the operations performed in the four work areas 5a, 6a, 7a and 7b will be, respectively, infeed-outfeed of the workpiece 1, machining, the removal of dust by free fall, and the pre-positioning of clamping means 102 by which the panel is secured in such a way as to accommodate any variation or change in the size or shape of work. In boring operations where the panel is drilled through, for example, consideration must be given to backstops; these can be of movable embodiment in order to aaccommodate different requirements, and in this instance the pause at the fourth area 7b can be exploited for the purpose of making the necessary adjustments.

Alternatively, the fourth face might be utilized as a second work station at which to install further spindle heads or toolage for fitting accessories (hinges, fasteners, etc.). Albeit more complex in construction, this further solution allows a more efficient removal of dust, which is able to fall freely through a vertical trajectory.

What is claimed:

1. A unit for machining workpieces having length and width dimensions comprising:

a frame defining a work space having an opening;

a polygonal shaped body having at least two side faces within said workspace;

means on each of said at least two side faces for mounting a workpiece thereon;

means for rotating said body and workpieces mounted thereon; and a tool mounted for opposing a workpiece within said work space to work on the workpiece mounted on one of said at least two side faces of said body opposite said tool as said tool as body is rotated to position a workpiece; another of said at least two side faces being available for mounting or de-mounting of a workpiece from the other position of said opening outside said workspace, and wherein the side faces of said polygonal shaped body are moved into and are of at least a portion of said work space as said body is rotated.

2. A unit as in claim 1 wherein the means for rotating said body rotates said body about a horizontal axis.

3. A unit as claim 1 wherein the tool is located within the work space to work on the workpiece within the frame work space.

4. A unit as in claim 1 wherein said frame opening is at an angle relative to the horizontal.

5. A unit as in claim 4 wherein said body has at least three said faces each for mounting a workpiece thereon.

6. A unit as in claim 1 wherein said frame has sloping from rails at the side ends of said opening, and said tool is movable with respect to said rails.

7. A unit as in claim 1 further comprising a seal for sealing the frame opening relative to the workpiece therein.

8. A unit as in claim 1 further comprising means acting within the work space for collecting pieces machined from the first workpiece that drop to the bottom of said work space as the body is rotated to move the workpiece worked on by said tool.

9. A unit as in claim 1 wherein said frame opening is at an angle relative to the horizontal.

10. A unit as in claim 8 further comprising a casing enclosing said workspace.

11. A unit as in claim 9 further comprising a seal for sealing the said opening relative to the side face of the body in the window.

\* \* \* \* \*

UNITED STATES PATENT AND TRADEMARK OFFICE
CERTIFICATE OF CORRECTION

PATENT NO.   : 5,564,483
DATED        : October 15, 1996
INVENTOR(S)  : Paride SACCHI

It is certified that error appears in the above-indentified patent and that said Letters Patent is hereby corrected as shown below:

On the title page: Item [30]    Foreign Application Priority Data, change "BO93A0422" to --BO93A000422--.

Signed and Sealed this

First Day of April, 1997

Attest:

Attesting Officer

BRUCE LEHMAN

Commissioner of Patents and Trademarks